W. I. THOMSON & H. G. THOMPSON.
HEATING.
APPLICATION FILED JAN. 11, 1907.
1,026,722.
Patented May 21, 1912.
4 SHEETS—SHEET 1.
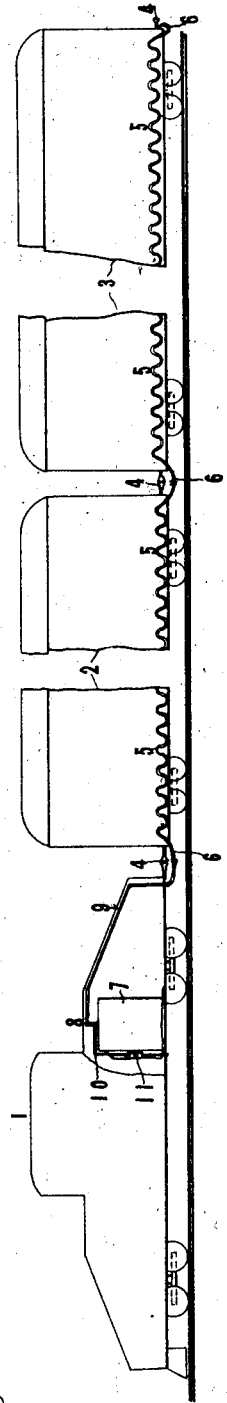
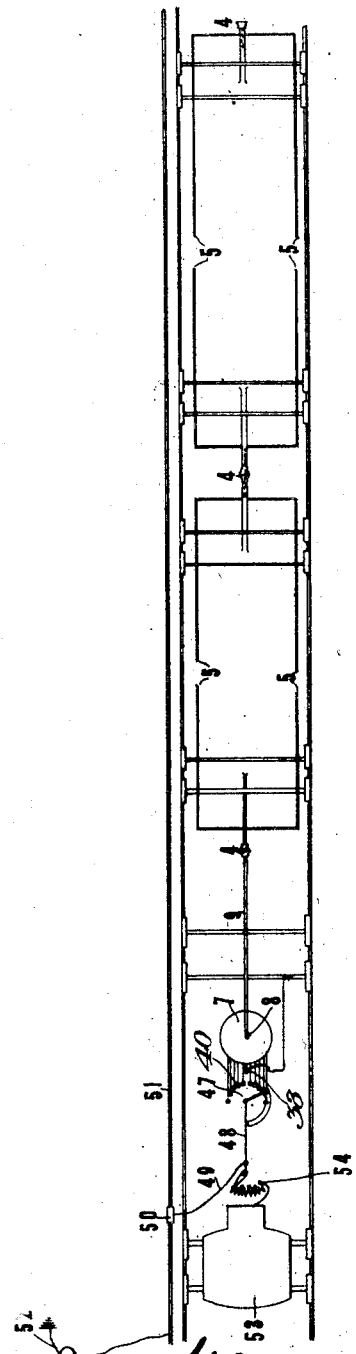

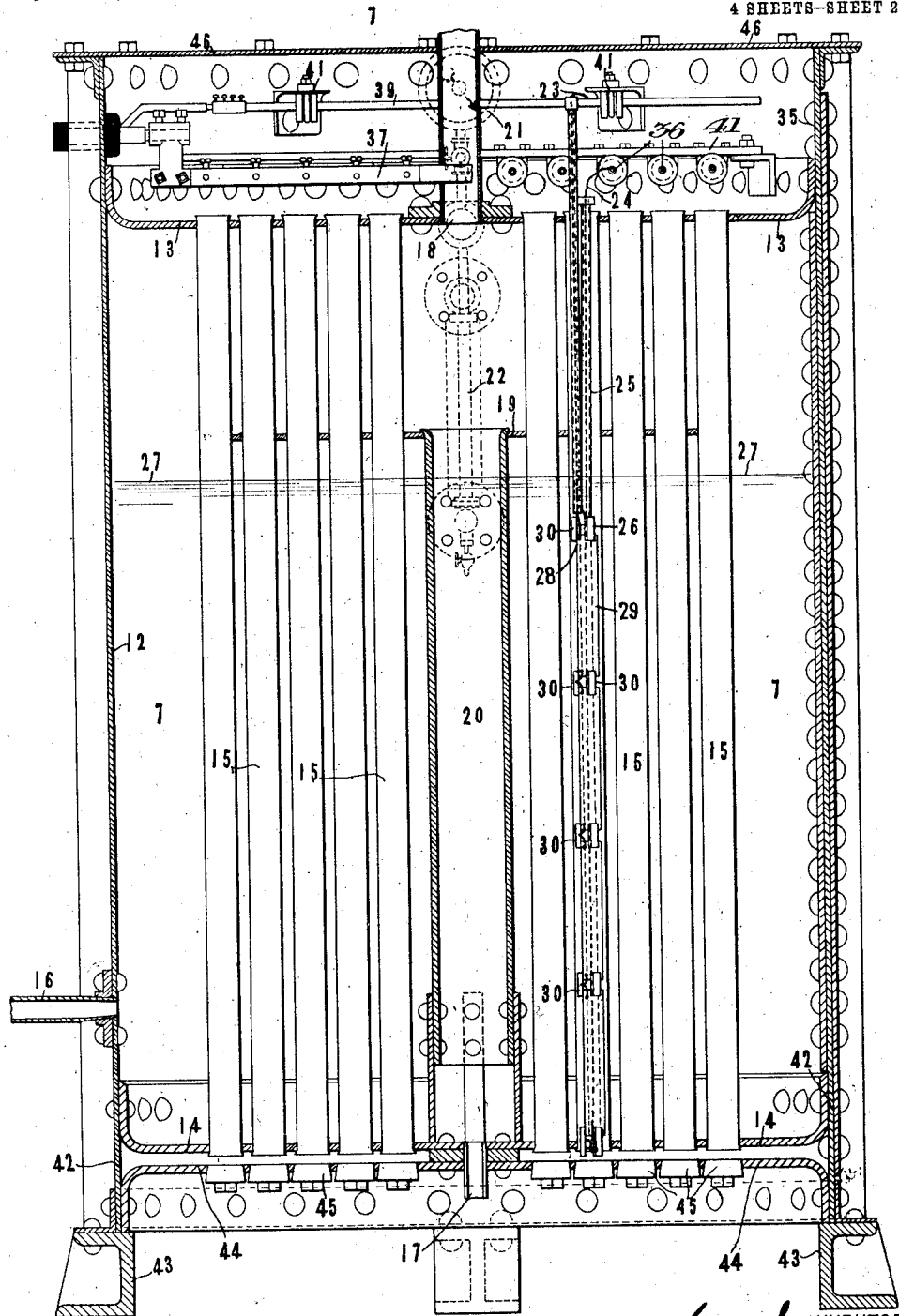

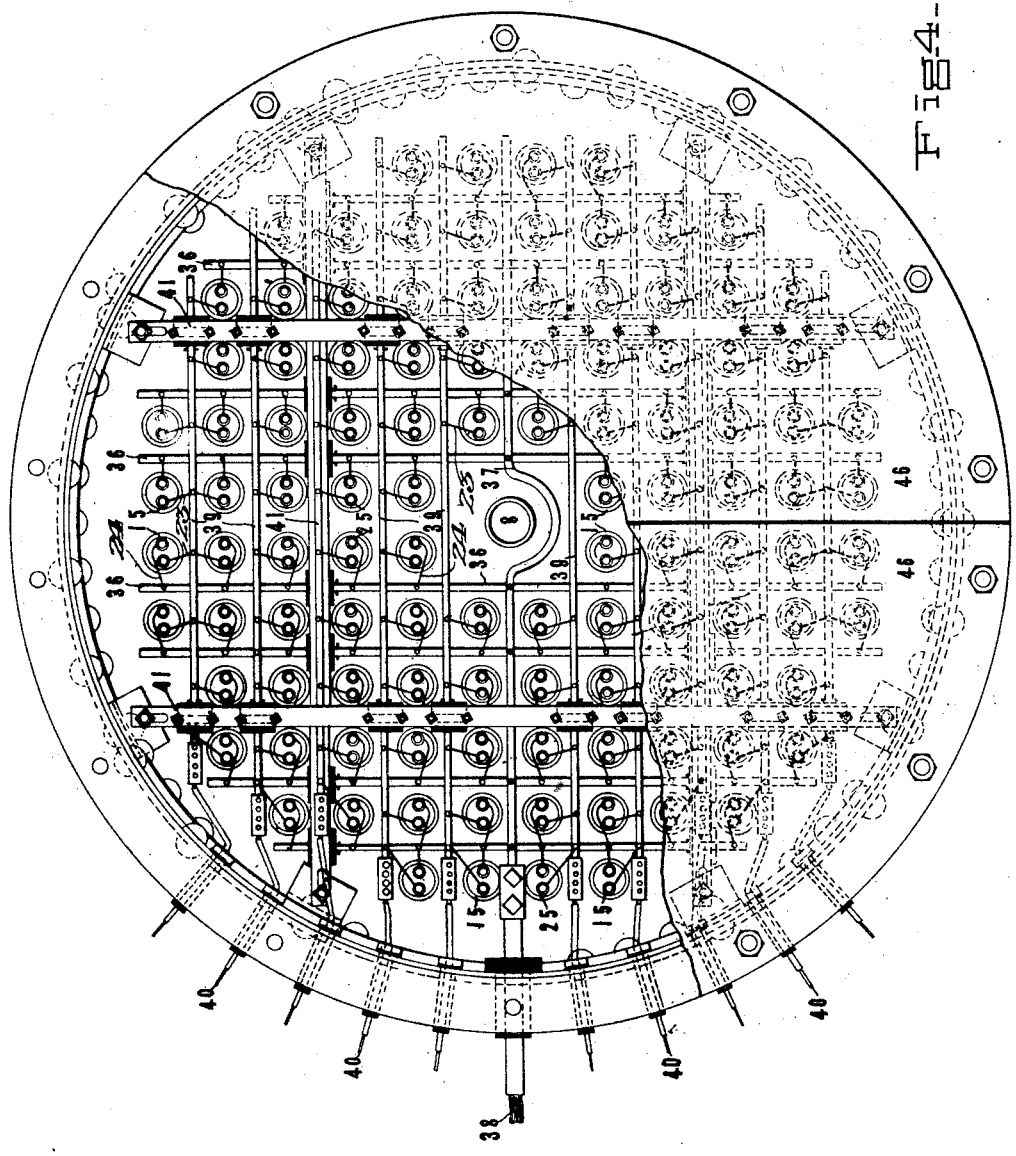

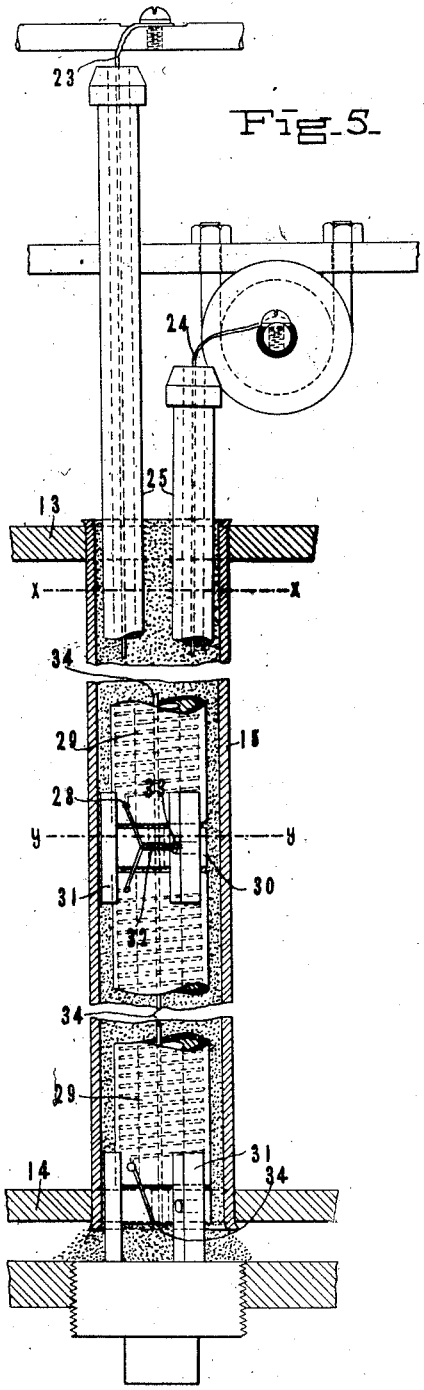
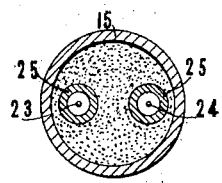
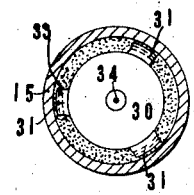
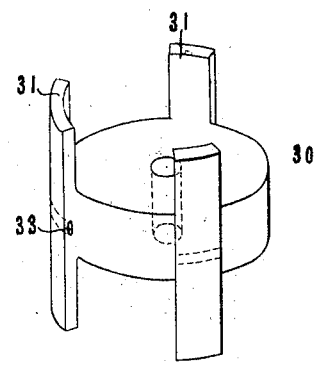

UNITED STATES PATENT OFFICE.

WILLIAM I. THOMSON, OF NEWARK, AND HARRISON G. THOMPSON, OF GLEN RIDGE, NEW JERSEY, ASSIGNORS TO SAFETY CAR HEATING & LIGHTING COMPANY, A CORPORATION OF NEW JERSEY.

HEATING.

1,026,722.  Specification of Letters Patent.  Patented May 21, 1912.

Application filed January 11, 1907. Serial No. 351,836.

*To all whom it may concern:*

Be it known that we, WILLIAM I. THOMSON and HARRISON G. THOMPSON, residing, respectively, at Newark and Glen Ridge, in the county of Essex and State of New Jersey, have invented certain new and useful Improvements in Heating, of which the following is a full, clear, and exact description, such as will enable others skilled in the art to which it appertains to make and use the same.

This invention relates to the generation of heat from an electric current, and the application of such heat for heating cars and the like.

One of the objects thereof is to provide efficient and practical apparatus for utilizing the heating effect of an electric current.

Another object is to provide apparatus of the above type for use in conjunction with cars.

Another object is to provide means of simple construction and efficient action for heating a train under variant running conditions.

Another object is to provide a practical art which can be readily carried on for heating trains under variant conditions.

Other objects will be in part obvious and in part pointed out hereinafter.

The invention accordingly consists in the several steps and the order and relation of each of the same with respect to one or more of the others thereof, and in the features of construction, combinations of elements and arrangement of parts, all as will be exemplified in the matter hereinafter set forth and indicated in the following claims.

In the accompanying drawings, in which is shown apparatus which may be used in carrying on our art and which embodies in itself certain features of our invention,—

Figure 1 is a diagrammatic elevation of a train and heating apparatus. Fig. 2 is a similar view in plan. Fig. 3 is a sectional elevation of a boiler. Fig. 4 is a plan thereof, certain parts being broken away in order to show the construction more clearly. Fig. 5 is a sectional elevation of a heating unit. Fig. 6 is a cross-section taken along the line $x-x$ of Fig. 5. Fig. 7 is a cross-section taken along the line $y-y$ of Fig. 5. Fig. 8 is a detailed perspective view of a spacing element.

Similar reference characters refer to similar parts throughout the several views of the drawings.

As tending to render more readily understood certain features of this invention it may here be noted that it has been found desirable, in running trains through tunnels and in like relations, to substitute electric for fuel-burning locomotives, and thus avoid the disagreeable and, on account of obscuring signals, dangerous, features of the accumulation of smoke in the tunnel passage. As the trains are to be heated when drawn by a fuel-burning locomotive without an accessible source of electric current, it is seen that fluid heating apparatus, as for example steam or hot water, are best employed. Upon the substitution of electricity as a source of motive power the temperature of the trains must of course be maintained, and it is desirable to avoid the expense and complication incident to the installation of electrical heating apparatus throughout the trains.

The above is among the problems dealt with in this invention, and the art whereby these ends are attained may be broadly outlined as lying in the utilizing of the electrical energy to generate steam upon the substitution of the electric for steam power and the directing of the steam so generated through the heating system used with the fuel-burning locomotive.

Broader features of our invention lie in the apparatus for utilizing the heating effect of electric current, various portions of which are of utility in relations other than that above indicated.

Referring now to Fig. 1 of the accompanying drawings, there is indicated an electric locomotive 1 connected with cars 2 and 3 as by couplings 4, which may be of the ordinary type. Steam heating apparatus 5 is installed in the cars 2 and 3, and the same are connected one with another and with the locomotive 1 as by the hose couplings 6. Upon locomotive 1 is mounted a boiler 7, from the steam pipe 8 of which a connection 9 leads to the train, and a branch connection 10 may if desired lead through a heating coil 11 upon the locomotive.

Referring now to Fig. 3 of the accompanying drawings, in which the boiler 7 appears in larger scale, there is shown a shell 12 having mounted therein the upper and lower heads 13 and 14 respectively, in which are expanded vertical heating tubes 15. The boiler is provided with a feed pipe 16, a drain or blow off 17, and a steam pipe leading at 18 through the upper head thereof, as well as with a baffle plate 19, mounted upon a support 20, and the usual accessories of pressure and water gages 21 and 22, the latter being indicated in dotted lines.

Within each heating tube 15 are led a pair of conductors 23 and 24, connected as hereinafter set forth in detail and passing preferably through porcelain tubes 25 to a point 26 beneath the water line 27 of the boiler. From this point one of these conductors 23 makes connection with a high resistance wire 28 coiled as shown in dotted lines in Fig. 5 about a tube 29 preferably of porcelain and having the outer surface of the coil enameled in order to do away with the chance of short-circuiting. In the embodiment shown there are provided a plurality of these coils placed end to end and held in alinement as by a porcelain separator 30 best shown in Fig. 8 of the drawings. This separator comprises a plurality of guides 31 extending upwardly and downwardly from the perforated body thereof, and adapted to embrace the ends of the coils positioned above and below the same, as best shown in Fig. 5. The terminals of each coil are detachably secured one to another as by twisting together, as at 32, and the meeting ends are inserted within a slot 33 in one of the abutments or guides 31 in order to hold the same against accidental contact with the tube 15. From the lowermost end of the lower coil a connection is led into the inner passage of the several tubular members upon which the coils are positioned, and thence wire 34 is led upwardly to make connection with conductor 24. Four units in each tube are in series. The space between the several coils and the tube is then evenly filled with a heat conducting material which preferably takes the form of white quartz sand. We have found sand to act as a highly efficient heat conducting medium, and to fill all the interstices and thus displace all air, the heat insulating qualities of which are well known. This sand, moreover, acts as a thorough insulation, and does away with all chance of short circuiting of the several turns of the coils one with another, or contact between the same and the heating tube. There is thus provided a heating element or unit which upon current being passed therethrough will quickly bring the corresponding tube to such a temperature, as, in conjunction with the similar action of the remaining tubes, will cause a rapid and sustained generation of steam in the boiler.

The shell 12 is preferably extended above the head 13 as indicated at 35, and within this extended portion are mounted a number of substantially parallel bus-bars 36 connected with the heavy bar 37 which leads to the terminal 38. Bus-bars 36, as will best be seen by reference to Fig. 4 of the drawings, are arranged parallel to the rows of tubes 15 and thus are brought in juxta-position to the same, and are electrically connected with the several conductors 24 leading therefrom.

Extending across the boiler in another direction, and also parallel to the rows in which the individual heating elements or units are disposed, are the several bus-bars 39, each of which is connected with the conductors 23 from the tubes adjacent thereto, and each of which leads to a separate terminal 40 without the boiler shell. It may here be noted that the sets of bus-bars 36 and 39 are arranged in different planes, or at different levels, whereby their relative insulation is insured and accessibility of all connections is gained, the outgoing terminals being insulated from the shell and suitable insulation being provided between the bus-bars and their several supports 41. It will thus be seen that upon current being led in either direction through the terminal 38 and one or more of the terminals 40 the same will be passed through the corresponding heating tubes 15 with a consequent generation of steam, as above set forth.

The boiler shell 12 is extended beyond the head 14, as shown at 42, and may be mounted upon a bed 43 of any desired form. Within the lower extended portion of the shell is secured an additional or supplemental head 44 having positioned therein plugs 45 one of which is opposite each of the heating tubes 15 and is adapted upon removal to permit the independent removal of the contents of the corresponding tube. This is readily accomplished by removing from the upper end of the shell the protecting cover 46, which is preferably bolted thereon in two sections, and releasing the connections of conductors 23 and 24, whereupon, by reason of the withdrawal of the corresponding plug 45, the entire contents of the tube may be withdrawn from the lower end, this action being facilitated by reason of the peculiar properties of the sand in which the coils are packed. If one of the coils is thus found to be defective, the same may be quickly removed and a new coil substituted, and the tube replaced in operative condition without disturbing the remaining tubes or even interrupting the steaming of the boiler.

Referring now to Fig. 2 of the drawings, it will be seen that the terminals 40 are led to the contacts of a controller 47, the same preferably being of the ordinary drum type, whereby any desired number of the corresponding bus-bars 39 are brought into circuit with a conductor 48 which is in turn connected with the conductor 49 leading from the contact shoe 50. The latter element preferably makes connection with a relatively stationary conductor, as a third rail 51, supplied as from a stationary generator 52, and the circuit is completed by a grounded conductor leading from terminal 38, a shown in Fig. 2. The motors 53 of the locomotive are also supplied from conductor 49, a controller 54 of any desired type being placed in circuit therewith.

It may here be noted that the term "steam heating apparatus" is used throughout in a broad sense as denoting apparatus which employs steam either for the direct radiation of heat or its indirect radiation, as through water, or apparatus in which water in liquid form only is employed to transmit heat from the source to the radiator. It may also here be noted that the term "shell" is herein used as denoting the outer walls of a boiler, whether the same is of cylindrical form or otherwise.

The operation and method of use of the above-described apparatus is substantially as follows: Assuming an electric locomotive 1 to be substituted for an ordinary fuel-burning locomotive in a train supplied with the steam heating apparatus 5, connection is made through the hose coupling 6 as with an ordinary locomotive, and any desired number of heating tubes within the boiler 7 are thrown into circuit by controller 47, as above set forth. It may here be noted that by this method of control the boiler may be caused to steam at any desired rate, to accord with temperature conditions, without the use of wasteful resistance or the change of potential at the terminals of the individual tube to a point other than that at which the most efficient action is gained. Upon current being passed through the tubes of the boiler, the steam is generated therein and supplied to the cars for heating purposes, in which it acts either directly or indirectly as the source of heat radiation, as above set forth. The overheating of the portion of the tubes above the water line, which is a common defect in many types of vertical boilers now in broad use, is done away with by the disposition of the heating elements precisely at the point at which the heat is desired, and all parts are readily accessible as for inspection or repair, as above set forth. The connections, moreover, are so disposed as to guarantee insulation one from another, and are fully protected by the extended portion of the boiler and the cap bolted thereon. Any moisture, moreover, tending to accumulate in the neighborhood of the connections or to pass into the heating tubes is quickly dissipated by reason of the proximity of the boiler head thereto. Upon the completion of the passage of a tunnel or at any other stage at which it is desired to replace the fuel-burning locomotive, the same is quickly accomplished without the necessity for breaking or making electrical connections, and the car heating apparatus is in condition for immediate use in its new relation. It will thus be seen that we have provided apparatus in which certain aims of our invention are fully achieved, and that there is herein set forth an art by which the remaining objects of this invention are attained.

The apparatus is of the simplest and most inexpensive construction, and its action is nevertheless essentially practical and effective. The art, moreover, may be readily carried on whether with the apparatus herein set forth or other apparatus, and does not require the employment of skilled labor or expert supervision.

As many changes could be made in the above method of carrying on our art, and as the same could be carried on through the use of widely different implements, and as many changes could be made in the above apparatus without departing from the scope of this invention, it is intended that all matter contained in the above description or shown in the accompanying drawings shall be interpreted as illustrative and not in a limiting sense.

Certain features herein shown and described are dealt with in the application of William I. Thomson for electric steam generator, filed July 23, 1909, Serial No. 509,169, and are accordingly not claimed herein.

Having described our invention, what we claim as new and desire to secure by Letters Patent is:—

1. In apparatus of the class described, in combination, a boiler having heating means therein a portion of which is above and a portion of which is below the water-line thereof, and electrical means adapted to generate heat locally in the submerged portion of said heating means.

2. In apparatus of the class described, in combination, a boiler having heating means therein a portion of which is above and a portion of which is below the water-line, electrical means adapted to generate heat locally in the submerged portion of said heating means, and non-heating electrical connections leading through the unsubmerged portion of said heating means.

3. In apparatus of the class described, in combination, a boiler having vertical heating tubes extending above and below the waterline thereof, and means adapted to generate heat locally in the submerged portion of said tubes.

4. In apparatus of the class described, in combination, a boiler having vertical heating tubes extending above and below the waterline thereof, means adapted to generate heat locally in the submerged portion of said tubes, and non-heating electrical connections leading through the unsubmerged portions thereof.

5. In apparatus of the class described, in combination, an electric conductor of high resistance adapted to serve as a source of heat upon a current passing therethrough, a series of relatively detachable members upon which said conductor is coiled, a member within which the coils of said conductor are positioned, and means interposed between said coils and said last-mentioned member adapted to transmit heat from one to the other thereof.

6. In apparatus of the class described, in combination, a boiler having heads and a plurality of heating tubes extending from one to another of said heads and secured therein, electrical heating elements disposed within said tubes each of which comprises a high resistance conductor, a source of current, and means connecting said conductors with said source of current in parallel one with another whereby each of said electrical heating elements can be disconnected without disturbing the connections of the others thereof.

7. In apparatus of the class described, in combination, means adapted to contain a vaporizable liquid, and means for heating said liquid comprising a tubular member of insulating material, a conductor passing through said member and thence about the exterior thereof, electrical insulating means covering the outer coils, a second tubular member surrounding the first tubular member, and granular heat conducting means between said tubular members whereby the first tubular member may be easily removed from said second member.

8. In apparatus of the class described, in combination, an electric conductor of high resistance adapted to serve as a source of heat upon a current passing therethrough, a plurality of relatively detachable members upon which said conductor is coiled, a tube within which said coiled portions of said conductor are positioned, and means interposed between said coiled portions and said tube and adapted to transmit heat from one to the other thereof.

9. In apparatus of the class described, in combination, a boiler adapted to contain a vaporizable liquid, a tubular member within the boiler in contact with the liquid to be vaporized, and a heating unit removably mounted in said tubular member, said unit comprising a base-plate adapted to be secured to the boiler, a tube of insulating material supported by said plate and removable therewith, and a conductor passing through said member and thence coiled about the exterior surface thereof.

10. In apparatus of the class described, in combination, a boiler, electrically heated elements connected in parallel and vertically disposed within said boiler, a source of current, and means adapted to vary the number of heating elements in operative relation to said source of current.

11. In apparatus of the class described, in combination, an electric conductor of high resistance adapted to serve as a source of heat upon a current passing therethrough, a series of relatively detachable members upon which said conductor is coiled, a member within which said coiled portions of said conductor are positioned, means interposed between said coiled portions and said last-mentioned member adapted to transmit heat from one to the other thereof, and means adapted to engage the ends of said first members and hold the same substantially in alinement.

12. In apparatus of the class described, in combination, a boiler, a plurality of electrically heated elements therein, a source of current, and means adapted to throw said elements into and out of circuit with said source of current in sets.

13. In apparatus of the class described, in combination, a boiler having a plurality of vertically disposed heating tubes therein, a high resistance conductor in the lower part of each of said tubes, a source of current, and means adapted to vary the number of said conductors in circuit with said source of current.

14. In apparatus of the class described, in combination, a boiler having heating tubes therein, electrically heated conductors removably mounted in said tubes, detachable connections for said conductors at one end of said tubes, and removable means adapted to expose said conductors at the opposite ends of said tubes and permit their removal.

15. In apparatus of the class described, in combination, a boiler having heating tubes vertically disposed therein, electrically heated conductors in said heating tubes, detachable connections for said conductors at the upper end of said tubes, and removable means at the lower end of said tubes adapted to expose and permit the removal of said conductors.

16. In apparatus of the class described, in combination, a vertical boiler shell, a head positioned at each end of said shell, heating tubes within said shell and mounted in said heads, a high resistance electric conductor in each of said tubes adapted to generate heat upon an electric current passing therethrough, and electric connections for said conductors outside of the upper of said heads.

17. In apparatus of the class described, in combination, a boiler shell, a head positioned at each end of said shell, heating tubes vertically disposed within said shell and mounted in said heads, a high resistance electric conductor in each of said tubes adapted to generate heat upon an electric current passing therethrough, electric connections for said conductors outside of the upper of said heads, and means inclosing and adapted to protect said connections.

18. In apparatus of the class described, in combination, a boiler shell, a head positioned at each end of said shell, heating tubes within said shell and mounted in said heads, a high resistance electric conductor in each of said tubes adapted to generate heat upon an electric current passing therethrough, electric connections for said conductors outside of one of said heads, said shell being extended beyond said last-mentioned head, and means removably mounted upon said extended portion of said shell adapted to inclose and protect said connections.

19. In apparatus of the class described, in combination, a receptacle adapted to contain water, a metallic heating tube within said receptacle in operative relation to the water, electric current utilizing means removably mounted in said tube adapted to generate heat therein, and an independent removable member adapted upon removal to permit the removal of the contents of said tube.

20. In apparatus of the class described, in combination, a receptacle adapted to contain water, a plurality of substantially parallel metallic heating tubes within said receptacle in operative relation to the water, electric current utilizing means removably mounted in each of said tubes adapted to generate heat therein, and removable means independently mounted in said receptacle corresponding with each of said tubes adapted upon removal to permit the removal of the contents of the corresponding tube.

21. In apparatus of the class described, in combination, a receptacle adapted to contain water, a plurality of substantially parallel metallic heating tubes secured within said receptacle in operative relation to the water, electric current utilizing means removably mounted in each of said tubes adapted to generate heat therein, and a plurality of plugs one of which is independently mounted in said receptacle opposite each of said tubes and is adapted upon removal to permit the independent removal of the contents of the corresponding tube.

22. In apparatus of the class described, in combination, a boiler shell, a head mounted at each end of said shell, heating tubes mounted within said heads, a high resistance conductor mounted in each of said tubes and adapted upon a current passing therethrough to serve as a source of heat, an additional head mounted at one end of said boiler, and a plurality of plugs mounted in said last-mentioned head one of which is opposite each of said tubes and is adapted upon removal to permit the removal of the contents of the corresponding tube.

23. In apparatus of the class described, in combination, a boiler shell, a head mounted at each end of said shell, heating tubes mounted within said heads, a high resistance conductor mounted in each of said tubes and adapted upon a current passing therethrough to serve as a source of heat, an additional head mounted at one end of said boiler, and a plurality of plugs mounted in said last-mentioned head one of which is opposite each of said tubes and is adapted upon removal to permit the removal of the contents of the corresponding tube, said shell being extended at one end beyond said first heads and having secured within the same said last-mentioned head.

24. In apparatus of the class described, in combination, a boiler shell, a head mounted at each end of said shell, heating tubes mounted within said heads, a high resistance conductor mounted in each of said tubes and adapted upon a current passing therethrough to serve as a source of heat, an additional head mounted at one end of said boiler, a plurality of plugs mounted in said last-mentioned head one of which is opposite each of said tubes and is adapted upon removal to permit the removal of the contents of the corresponding tube, and electric connections for said tubes outside the head at the opposite end of the boiler.

25. In apparatus of the class described, in combination, a boiler shell, a head mounted at each end of said shell, heating tubes mounted within said heads, a high resistance conductor mounted in each of said tubes and adapted upon a current passing therethrough to serve as a source of heat, an additional head mounted at one end of said boiler, a plurality of plugs mounted in said last-mentioned head one of which is opposite each of said tubes and is adapted upon removal to permit the removal of the contents of the corresponding tube, electric connections for said tubes outside the head at the opposite end of the boiler, and means mounted upon said shell and covering and protecting said connections.

26. In apparatus of the class described, in combination, a boiler shell, a head mounted at each end of said shell, heating tubes mounted within said heads, an electric conductor of high resistance positioned in each of said tubes and adapted upon a current passing therethrough to serve as a source of heat, connections leading to said conductors and terminating outside of one of said heads, said shell being extended beyond said heads at each end of the boiler, means mounted upon said extended portion of said shell adapted to inclose and protect said connections, means mounted upon said extended portion of said shell at the opposite end of the boiler, and plugs positioned in said last-mentioned means opposite each of said tubes and adapted upon removal to permit the removal of the contents of the corresponding tube.

27. In apparatus of the class described, in combination, a boiler shell, a head mounted within said shell at each end of said boiler, heating tubes mounted within said heads, an electric conductor of high resistance positioned in each of said tubes and adapted to serve as a source of heat upon a current passing therethrough, connections leading to said conductor and terminating outside of said tubes at one end of the boiler, and a steam pipe leading from said boiler through said connections.

28. In apparatus of the class described, in combination, a boiler shell, a head mounted within said shell at each end of said boiler, heating tubes mounted within said heads, an electric conductor of high resistance positioned in each of said tubes and adapted to serve as a source of heat upon a current passing therethrough, connections leading to said conductor and terminating outside of said tubes at one end of the boiler, a steam pipe leading from said boiler through said connections, said shell being extended beyond said head adjacent said connections, and means removably mounted upon said shell about said steam pipe adapted to inclose and protect said connections.

29. In apparatus of the class described, in combination, a plurality of electrical elements each comprising a conductor, a plurality of bus-bars extending across said elements in one direction and connected with one terminal of each of said conductors, and a plurality of bus-bars extending across said elements in another direction and connected with the other terminal of each of said conductors.

30. In apparatus of the class described, in combination, a plurality of electrical elements each comprising a conductor, a plurality of bus-bars extending across said elements in one direction and connected with one terminal of each of said conductors, and a plurality of bus-bars extending across said elements in another direction and connected with the other terminal of each of said conductors, said sets of bus-bars being positioned in different planes.

31. In apparatus of the class described, in combination, a plurality of electrical elements each comprising a conductor and being disposed in rows in two directions, a plurality of bus-bars extending substantially parallel to one of said sets of rows and connected to one terminal of each of said conductors, and a plurality of bus-bars extending substantially parallel with the other of said sets of rows and connected with the other terminal of each of said conductors.

32. In apparatus of the class described, in combination, a plurality of electrical elements each comprising a conductor and being disposed in rows in two directions, a plurality of bus-bars extending substantially parallel to one of said sets of rows and connected to one terminal of each of said conductors, and a plurality of bus-bars extending substantially parallel with the other of said sets of rows and connected with the other terminal of each of said conductors, said sets of bus-bars being positioned in different planes.

33. In apparatus of the class described, in combination, a boiler, a plurality of heating coils disposed within said boiler, a plurality of bus-bars extending across said boiler in one direction and connected with one terminal of each of said coils, and a plurality of bus-bars extending in another direction across said boiler and connected with the other terminal of each of said coils.

34. In apparatus of the class described, in combination, a boiler, having an upper and lower head and an intermediate heating coil disposed within said boiler substantially beneath the water line thereof, and conductors extending from the terminals of said coil to a position above said boiler.

35. In apparatus of the class described, in combination, a boiler, vertical heating tubes disposed within said boiler, a heating coil in each of said heating tubes substantially beneath the water line thereof, and conductors extending from the terminals of said coil through said tube to the upper end of said boiler.

36. In apparatus of the class described, in combination, a boiler, vertical heating tubes disposed within said boiler, a heating coil in each of said heating tubes substantially beneath the water line thereof, conductors extending from the terminals of said coils through said tubes to the upper end of said boiler, a plurality of bus-bars extending across said boiler in one direction and connected with one of said conductors from each tube, and a plurality of bus-bars extending across said boiler and connected with the other conductor from each of said tubes.

37. In apparatus of the class described, in combination, a boiler, vertical heating tubes disposed within said boiler, a heating coil in each of said heating tubes substantially beneath the water line thereof, conductors extending from the terminals of said coils through said tubes to the upper end of said boiler, a plurality of bus-bars extending across said boiler in one direction and connected with one of said conductors from each tube, and a plurality of bus-bars extending across said boiler and connected with the other conductor from each of said tubes, said sets of bus-bars being positioned in different planes.

38. In apparatus of the class described, in combination, a boiler, vertical heating tubes disposed within said boiler, a heating coil in each of said heating tubes substantially beneath the water line thereof, conductors extending from the terminals of said coils through said tubes to the upper end of said boiler, a plurality of bus-bars extending across said boiler in one direction and connected with one of said conductors from each tube, and a plurality of bus-bars extending across said boiler and connected with the other conductor from each of said tubes, said tubes being disposed in regular rows in two directions across said boiler, and the bus-bars of said sets being respectively parallel to said rows in said two directions.

39. In apparatus of the class described, in combination, a boiler shell, heads positioned within said shell, heating tubes mounted within said heads, heating coils mounted within said tubes, the terminals of which terminate without one of said heads, a plurality of bus-bars extending across said shell and connected with one of the terminals from each of said coils, and a plurality of bus-bars extending across said shell and connected with the other of the terminals of each of said coils.

40. In apparatus of the class described, in combination, a plurality of electrical elements each comprising a conductor, a plurality of bus-bars extending across said elements in one direction and connected to one terminal of each of said conductors, and a plurality of bus-bars extending across said elements in a different plane from said first-mentioned bus-bars and connected with the other of the terminals of each of said elements.

41. In apparatus of the class described, in combination, a boiler, a plurality of heating coils disposed therein, the terminals of which are positioned without one end of said boiler, a plurality of bus-bars extending across said boiler and connected with one terminal of each of said coils, and a plurality of bus-bars extending across said boiler in a different plane and connected with the other terminal of each of said coils.

42. In apparatus of the class described, in combination, a boiler, a plurality of heating coils disposed therein, the terminals of which are positioned without one end of said boiler, a plurality of bus-bars extending across said boiler and connected with one terminal of each of said coils, a plurality of bus-bars extending across said boiler in a different plane and connected with the other terminal of each of said coils, the shell of said boiler being extended beyond said head, and means mounted upon said extended portion of said shell and inclosing and protecting said connections.

43. In apparatus of the class described, in combination, a boiler shell, a head disposed within said shell at each end of said boiler, heating tubes mounted within said heads, a heating coil positioned in each of said tubes, the terminals of each of which extend without said tube at one end of the boiler, a plurality of bus-bars extending across said boiler and connected with one of the terminals from each of said coils, a plurality of bus-bars extending across said boiler and connected with the other of the terminals from each of said coils, means inclosing and protecting said connections, an additional head mounted at the opposite end of said boiler, and plugs mounted in said last-mentioned head opposite each of said tubes and adapted upon removal to permit the removal of the contents of the corresponding tube.

44. In apparatus of the class described, in combination, a boiler shell, a head disposed within said shell at each end of said boiler, heating tubes mounted within said heads, a heating coil positioned in each of said tubes, the terminals of each of which extend without said tube at one end of the boiler, a plurality of bus-bars extending across said boiler and connected with one of the terminals from each of said coils, a plurality of bus-bars extending across said boiler and connected with the other of the terminals from each of said coils, means inclosing and protecting said connections, an additional head mounted at the opposite end of said boiler, and plugs mounted in said last-mentioned head opposite each of said tubes and adapted upon removal to permit the removal of the contents of the corresponding tube, said sets of bus-bars being disposed in different planes.

45. In apparatus of the class described, in combination, a boiler shell, a head disposed within said shell at each end of said boiler, heating tubes mounted within said heads, a heating coil positioned in each of said tubes, the terminals of each of which extend without said tube at one end of the boiler, a plurality of bus-bars extending across said boiler and connected with one of the terminals from each of said coils, a plurality of bus-bars extending across said boiler and connected with the other of the terminals from each of said coils, means inclosing and protecting said connections, an additional head mounted at the opposite end of said boiler, and plugs mounted in said last-mentioned head opposite each of said tubes and adapted upon removal to permit the removal of the contents of the corresponding tube, said tubes being arranged in rows across said boiler, and said bus-bars being disposed substantially parallel to said rows.

46. In apparatus of the class described, in combination, a receptacle adapted to contain water, a plurality of vertically disposed heating tubes mounted within said receptacle, a heating coil disposed in each of said tubes, and sand interposed between each of said heating coils and the corresponding tube and adapted to transmit heat from one to the other thereof.

47. In apparatus of the class described, in combination, a receptacle adapted to contain water, a plurality of heating tubes mounted within said receptacle, a heating coil disposed in each of said tubes, and sand interposed between each of said heating coils and the corresponding tube and adapted to transmit heat from one to the other thereof, each of said coils being wound upon a plurality of relatively detachable members.

48. In apparatus of the class described, in combination, a receptacle adapted to contain water, a plurality of heating tubes mounted within said receptacle, a heating coil disposed in each of said tubes, and means interposed between each of said heating coils and the corresponding tube and adapted to transmit heat from one to the other thereof, each of said coils being wound upon a plurality of relatively detachable members.

49. In apparatus of the class described, in combination, a boiler shell, heads mounted within said shell, heating tubes mounted within said heads, a heating coil positioned within each of said tubes, means interposed between each of said coils and the corresponding tube and adapted to transmit heat from one to the other thereof, an additional head mounted at one end of said boiler, and a plurality of plugs mounted in said head and positioned opposite each of said tubes whereby upon one of said plugs being removed the contents of the corresponding tube may be removed.

50. In apparatus of the class described, in combination, a boiler shell, heads mounted within said shell, heating tubes mounted within said heads, a heating coil positioned within each of said tubes, sand interposed between each of said coils and the corresponding tube and adapted to transmit heat from one to the other thereof, an additional head mounted at one end of said boiler, and a plurality of plugs mounted in said head and positioned opposite each of said tubes whereby upon one of said plugs being removed the contents of the corresponding tube may be removed.

51. In apparatus of the class described, in combination, a receptacle adapted to contain water, a plurality of heating tubes mounted within said receptacle, a heating coil disposed in each of said tubes, and means interposed between each of said heating coils and the corresponding tube and adapted to transmit heat from one to the other thereof, each of said coils being wound upon a plurality of relatively detachable members disposed end to end in the corresponding tube.

52. In apparatus of the class described, in combination, a boiler having a heating tube disposed therein, a heating coil within said tube substantially below the water line of said boiler, sand interposed between said coil and said tube and adapted to transmit heat from one to the other thereof, and relatively insulated conductors leading from the terminals of said coils above the water-line of said boiler.

53. In apparatus of the class described, in combination, a boiler having a heating tube disposed therein, a heating coil within said tube substantially below the water line of said boiler, sand interposed between said coil and said tube and adapted to transmit heat from one to the other thereof, and relatively insulated conductors leading from the terminals of said coils without said boiler, said heating coil being wound upon a plurality of relatively detachable members disposed end to end.

54. In apparatus of the class described, in combination, a boiler having a heating tube disposed therein, a heating coil within said tube substantially below the water line of said boiler, sand interposed between said coil and said tube and adapted to transmit heat from one to the other thereof, relatively insulated conductors leading from the terminals of said coils without said boiler, said heating coil being wound upon a plurality of relatively detachable members disposed end to end, and means adapted to engage the ends of said members and hold the same substantially in alinement.

55. In apparatus of the class described, in combination, a boiler shell, heads mounted within said shell, heating tubes mounted within said heads, heating coils positioned within said tubes substantially below the water line thereof, sand interposed between said coils and said tubes, electric conductors leading from the terminals of said coils without one of the heads of said boiler, a plurality of bus-bars connected with one of said conductors of each tube, a plurality of bus-bars connected with the other of the conductors of each tube, and means at the opposite end of the boiler comprising a plurality of plugs positioned opposite said tubes and adapted upon removal to permit the removal of the contents of the corresponding tube.

56. In apparatus of the class described, in combination, a boiler shell, heads mounted within said shell, heating tubes mounted within said heads, heating coils positioned within said tubes substantially below the water line thereof, sand interposed between said coils and said tubes, electric conductors leading from the terminals of said coils without the head at one end of said boiler, a plurality of bus-bars connected with one of said conductors of each tube, a plurality of bus-bars connected with the other of the conductors of each tube, and means at the opposite end of the boiler comprising a plurality of plu , positioned opposite said tubes and adapted upon removal to permit the removal of the contents of the corresponding tube, said sets of bus-bars being disposed in different planes.

57. In apparatus of the class described, in combination, a boiler shell, heads mounted within said shell, heating tubes mounted within said heads, heating coils positioned within said tubes substantially below the water line thereof, sand interposed between said coils and said tubes, electric conductors leading from the terminals of said coils without the head at one end of said boiler, a plurality of bus-bars connected with one of said conductors of each tube, a plurality of bus-bars connected with the other of the conductors of each tube, means at the opposite end of the boiler comprising a plurality of plugs positioned opposite said tubes and adapted upon removal to permit the removal of the contents of the corresponding tube, said shell being extending beyond said bus-bars, and means mounted upon said extended portion of said shell adapted to inclose and protect said connections.

58. In apparatus of the class described, in combination, a boiler having heating tubes vertically disposed therein, electrically heated conductors in said heating tubes, detachable connections for said conductors at the upper end of said tubes, and removable means at the lower end of said tubes adapted to expose and permit the removal of said conductors, said removable means comprising separate members respectively mounted opposite the tubes.

59. In apparatus of the class described, in combination, a boiler having heating means therein a portion of which is above and a portion of which is below the water line thereof, electrical means adapted to generate heat locally in the submerged portion of said heating means, and a granular non-conducting material interposed between said heating means and said electrical means and adapted to transmit heat from one to the other thereof.

60. In apparatus of the class described, in combination, a boiler having heating means therein a portion of which is above and a portion of which is below the water line thereof, electrical means adapted to generate heat locally in the submerged portion of said heating means, a source of current, and means adapted to vary the number of said electrical means in circuit with said source of current.

61. In apparatus of the class described, in combination, a boiler having heating means therein a portion of which is above and a portion of which is below the water line thereof, electrical means adapted to generate heat locally in the submerged portion of said heating means, detachable electrical connections for said electrical means at one end of said boiler, and removable means adapted to expose said electrical means at the opposite end thereof.

62. In apparatus of the class described, in combination, a boiler having vertical heating tubes extending above and below the water line thereof, means adapted to generate heat locally in the submerged portion of said tubes, detachable electrical connections at one end of said tubes, and means adapted to expose and permit the removal of said electrical means at the opposite end of said tubes.

63. In apparatus of the class described, in combination, a boiler having heads and a plurality of heating tubes extending from one to another of said heads and secured therein, electrical heating elements disposed within said tubes each of which comprises a high resistance conductor, a source of current, means connecting said conductors with said source of current in parallel one with another whereby each of said electrical heating elements can be removed without disturbing the connections of the others thereof, and means adapted to vary the number of said conductors in circuit with said source of current.

64. In apparatus of the class described, in combination, a boiler having heads and a plurality of heating tubes extending from one to another of said heads and secured therein, electrical heating elements disposed within said tubes each of which comprises a high resistance conductor, a source of current, means connecting said conductors with said source of current in parallel one with another whereby each of said electrical heating elements can be removed without disturbing the connections of the others thereof, and means at the end of said boiler opposite from said connecting means adapted to expose and permit the removal of said electrical heating elements.

65. In apparatus of the class described, in combination, a boiler having heating tubes therein, electrically heated conductors removably mounted in said tubes, detachable connections for said conductors at one end of said tubes, removable means adapted to expose said conductors at the opposite ends of said tubes and permit their removal, a source of current, and means adapted to vary the number of said electrical heating means in circuit with said source of current.

In testimony whereof we affix our signatures, in the presence of two witnesses.

WILLIAM I. THOMSON.
HARRISON G. THOMPSON.

Witnesses:
R. S. BLAIR,
F. E. KESSINGER.